United States Patent [19]

Swanson

[11] Patent Number: 4,975,006

[45] Date of Patent: Dec. 4, 1990

[54] CARBON-CARBON FASTENERS, BOLT TYPE

[75] Inventor: Kurt W. Swanson, Kent, Wash.

[73] Assignee: General Dynamics Corporation, Convair Division, San Diego, Calif.

[21] Appl. No.: 528,390

[22] Filed: May 25, 1990

[51] Int. Cl.$^5$ .................. F16B 13/04; F16B 39/02
[52] U.S. Cl. ........................ 411/19; 411/82; 411/361; 411/901; 411/908; 29/522.1; 29/525.1
[58] Field of Search ............. 411/19, 20, 82, 258, 411/257, 361, 908, 901; 29/525.1, 525.2, 522.1

[56] References Cited

U.S. PATENT DOCUMENTS

| 4,687,394 | 8/1987 | Berecz | 411/361 |
| 4,687,395 | 8/1987 | Berecz et al. | 411/361 |
| 4,687,397 | 8/1987 | Berecz | 411/361 |
| 4,687,398 | 8/1987 | Berecz | 411/361 |
| 4,863,330 | 9/1989 | Olez et al. | 411/908 |

Primary Examiner—Neill R. Wilson
Attorney, Agent, or Firm—John R. Duncan; Frank D. Gilliam

[57] ABSTRACT

The fastening together of structural elements formed from carbon-carbon is accomplished by a fastener constructed from 2-D or 3-D carbon-carbon in the form of a high angle helical threads on one end and a countersunk head with a carbon-carbon central insert on the other end with the threaded end inserted through the carbon-carbon structural elements to be joined. A metal is painted on the threads and the shank on the fastener. A collar formed from carbon-carbon is fitted over the course threaded end of the fastener with the distal end of the threads extending therefrom. While passing a heating current through the fastener, the head and the collar of the fastener are forced together. The fastener is heated to an elevated temperature in the presence of an Oxygen gas cover which causes the powered metal to expand up to 100% binding the fastener to the carbon-carbon components, collar and insert.

11 Claims, 1 Drawing Sheet

CARBON-CARBON FASTENERS, BOLT TYPE

BACKGROUND OF THE INVENTION

The invention is directed to the joinder of materials and particulary to the joinder of structural material formed from carbon-carbon composites.

This invention concerns threaded fastening members. A major problem involved in the use of threaded fastening members is that of loosening or relaxation caused by stress or by vibration. Another problem is the fracturing or other damage to the materials to be joined by the fastener being tensioned.

Generally to overcome the first of these problems, the threads of the fastener are coated with a sealing or locking compound. An example of locking the threads inplace in this manner is taught by the following patents.

U.S. Pat. No. 3,814,156 teaches coating the threads with a microencapsulated liquid adhesive and a torque tensioning agent which brings the torque-tension relationship of the coated threaded member to a minimum of approximately 80% of the torque-tension relationship of the threaded member without the coating.

U.S. Pat. No. 4,191,677 teaches placing a patch of unpolymerized thermoplastic polymer on the threaded fastener as a liquid which is spread over the threads when threaded and allowed to cure at room temperature after the fastener is set. The Patent teaches away from using heat on the threaded member.

U.S. Pat. No. 4,132,815 teaches a method similar to the last referenced Patent except heat is applied to the threaded area to facilitate cure.

U.S. Pat. No. 4,576,847 teaches the use of a threaded member constructed of a fiber-reinforced plastic coated with a crosslinked resin. The resin is caused to crosslink by the addition of an organic acid.

One of the most pressing challenges in the development of carbon-carbon composite material as a structural material for aerospace application, is the joining and fastening of the various airframe elements. A bolt type fastener can be obtained but the machined threads in the carbon-carbon and high torque required to seat the bolt often exceeds the load carrying capability of the composite threads. This is especially true when large number of fibers are severed during the machining of the threads. An alternate and unique method proposed herein, relies on friction and a large preload to secure a collar unto a bolt shank.

SUMMARY OF THE INVENTION

The solution to the problem of joining carbon-carbon structural materials in a satisfactory manner as presented herein relies on friction and a larger preload to secure a collar onto a bolt shank. Specifically, a filler material which undergoes permanent expansion when reacted with a gas when heated is employed to lock the collar onto the shank of the fastener. A filler material in the form of a powered metal such as Silicon or Titanium is applied to the thread area of a fastener and then installed. The bolt shank is subsequently heated in a controlled manner reacting the powered metal with a continuously supplied cover of gas. The resulting change in volume of the reacted material (in some cases greater than 100%) fills the available voids and exerts pressure on the fastener and collar locking the collar onto the shank. The degree of interference, or preload, of the collar can be controlled by the quantity of the filler material and clearance of the collar.

An object of this invention is to provide an improved fastener for fastening together carbon-carbon structural material.

Another object off this invention is to provide a fastener for fastening together carbon-carbon structural material which relies on friction and a large preload.

Still another object of this invention is to provide a fastener for fastening carbon-carbon structural material together without damaging the joined material.

Yet another object of this invention is to secure a screw type fastener without the necessity of threading the fastener into material.

These and other objects and advantages of the present invention will become apparent to those skilled in the art after considering the following detailed specification in which the preferred embodiment are described in conjunction with the accompanying drawing Figures.

BRIEF DESCRIPTION OF THE DRAWING FIGURES

FIG. 1 is a side cutaway showing of the fastener of the present invention inplace between two plates of carbon-carbon structural material and FIG. 2 is a showing taken along line 2—2 of FIG. 1.

DESCRIPTION OF THE PREFERRED EMBODIMENT

Figure 1:
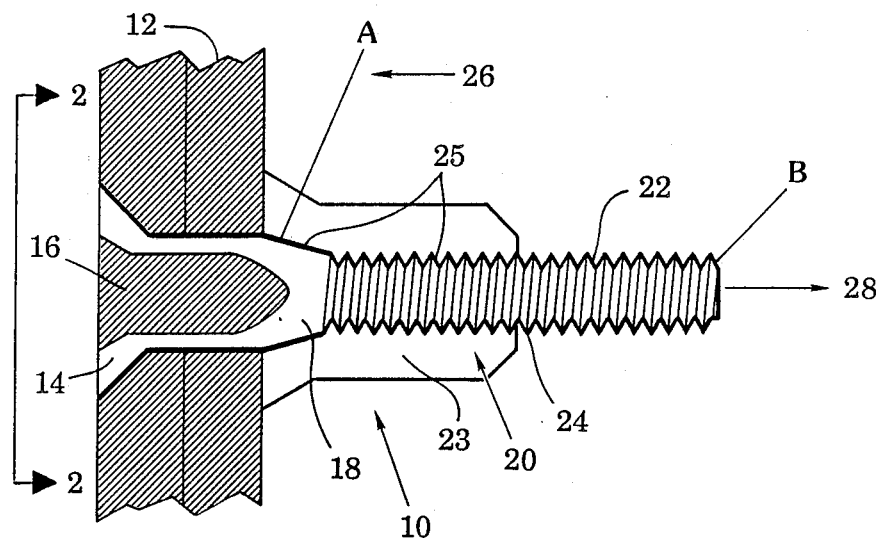
Figure 2:
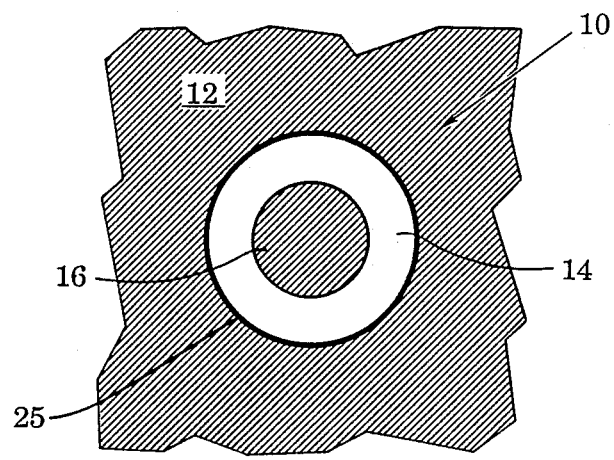

Referring now to the drawing Figures, FIG. 1 shows a cutaway of the fastening system 10 of the invention inplace fastening together a pair of carbon-carbon structural members 12 in a lapjoint type application and FIG. 2 is a front view of the head 14 of the fastener 15 of the fastening system 10. The head includes a 2-D, or a 3-D carbon insert 16 for the purpose of forming a head. The fastener body 18 is formed of 2-D carbon-carbon or 3-D carbon-carbon. One piece or two piece construction.

The shank 20 comprises a course threaded area 22 with the threads formed from a continuous carbon fiber tow extending from the head of the fastener to the threaded end of the fastener.

A collar 23 is positioned on the opposite side of the carbon-carbon plates 12 from the head 14. An opening 24 through the end of the collar provides a tight slip fit over the distal end of the threaded area 22. Prior to the installation as shown in FIG. 1, a filler material 25 in the form of a powered metal is applied to the threads and between the bolt head and shank surfaces which have contact with the plates. The powered metal could be, by way of example and not by way of limitation, Silicon, Titanium, Zirconium, Aluminum, or any other material that expands in volume when heated in a gaseous atmosphere. Silica and Titania are the preferential metal powders. The preferential gas for use as the gaseous atmosphere is Oxygen or any other gas that causes the desired reaction with the material of the fastener and carbon-carbon materials to be joined. When the fastener system 10 is installed as shown in drawing FIG. 1, force is applied by any convenient means such as, a clamping with a pneumatic gun, or the like, along arrows 26 and 28 whereby the collar and fastener force the plates 12 together in a prestressed together condition.

While the force is applied along arrows 26 and 28, the system is supplied with a gas cover and a controlled current is caused to flow between A and B through the fastener 15. This current, due to the resistance of the fastener 15, causes the fastener to heat. When the fastener heats the metallic powder thermally reacts with the gas. This thermal reaction causes a large volume increase in the metallic powder applied areas which causes the collar opening to clamp onto the shank thereby maintaining the prestressed pressure between the fastening system 10 and the plates 12. The degree of interference, or preload, of the collar can be controlled by the quantity of the filler material applied to the threads and fastener body and the initial clearance between the collar and the threads.

While there have been shown and described the preferred embodiment of the fastening system in accordance with the invention, it will be appreciated that many changes and modifications may be made therein without, however, departing from the essential spirit thereof.

What is claimed is:

1. A fastening system for joining together at least two pieces of structural carbon-carbon material comprising:
    a fastener, said fastener having an enlarged head for engaging a first side of one of said at least two pieces of structural carbon-carbon material to be joined and a threaded shank having a distal end extending through and beyond said at least two pieces of structural material to be joined;
    a collar member with a central aperture configured to tightly slip over said distal end of said threads and press against the side of said materials to be joined remote from said head; and
    a layer of a metallic powder which expands when heated in a gaseous atmosphere covering the surface of said fastener adjacent to said material to be joined and said collar whereby when the fastener is heated said metallic powder reacts with the gas of said gaseous atmosphere causing said metallic powder to expand and locking said collar to said threads and said fastener to said material which it passes through.

2. The invention as defined in claim 1 wherein said head additionally comprises a carbon-carbon central insert.

3. The invention as defined in claim 1 wherein said threads are formed of a continuous carbon fiber tow.

4. The invention as defined in claim 1 wherein said metallic material is Silica.

5. The invention as defined in claim 1 wherein said metallic powder is Titania.

6. The invention as defined in claim 1 wherein said gaseous atmosphere is Oxygen.

7. A method of joining materials of carbon-carbon structure comprising the steps of:
    providing a large headed elongated fastener having a shank containing high angle helical threads;
    coating said fastener in the areas that come in contact with said materials to be joined and said threads with a metallic powder which expands when reacted with a specific gas;
    passing the fastener through said materials and beyond with said head securing said fastener from passing entirely therethrough;
    providing a collar with a central aperture and passing the distal end of said threaded portion through said aperture;
    providing a force on said fastener for forcing the materials together between said head and said collar;
    heating said fastener to an elevated temperature in the presence of said specific gas whereby said coating expands locking said collar to said threads and said material to said head.

8. The method of claim 7 wherein said threads are formed of 2-D and 3-D carbon-carbon.

9. The method of claim 7 wherein said coating is Silicon.

10. The method of claim 7 wherein said coating is selected from a group of metals consisting of Titanium, zirconium and aluminum.

11. The method of claim 7 wherein said specific gas is Oxygen.

* * * * *